United States Patent
Heerdt et al.

(10) Patent No.: US 7,723,647 B2
(45) Date of Patent: May 25, 2010

(54) INFORMATION COMMUNICATION SYSTEMS BETWEEN COMPONENTS OF A HOT MELT ADHESIVE MATERIAL DISPENSING SYSTEM

(75) Inventors: Dieter B. Heerdt, Hendersonville, TN (US); Michael Surenbrock, Krefeld (DE)

(73) Assignee: Illinois Tool Works Inc., Glenview, IL (US)

( * ) Notice: Subject to any disclaimer, the term of this patent is extended or adjusted under 35 U.S.C. 154(b) by 234 days.

(21) Appl. No.: 11/905,189

(22) Filed: Sep. 28, 2007

(65) Prior Publication Data

US 2009/0084773 A1    Apr. 2, 2009

(51) Int. Cl.
*B67D 7/76* (2010.01)
*H05B 1/00* (2006.01)

(52) U.S. Cl. .................... 219/221; 219/508; 222/54; 222/146.5

(58) Field of Classification Search ......... 219/481–487, 219/494, 497, 505, 507–509, 221; 222/146.5
See application file for complete search history.

(56) References Cited

U.S. PATENT DOCUMENTS

| 4,214,130 | A | 7/1980 | Questad |
| 5,434,401 | A | 7/1995 | Bauser |
| 6,752,323 | B1 | 6/2004 | Roos et al. |
| 6,838,958 | B2 | 1/2005 | Lonsdale et al. |
| 2005/0092736 | A1* | 5/2005 | Raterman et al. ........... 219/508 |
| 2006/0036346 | A1* | 2/2006 | Andersen et al. ........... 700/213 |

FOREIGN PATENT DOCUMENTS

WO    WO 2006121658    11/2006

* cited by examiner

*Primary Examiner*—Tu B Hoang
*Assistant Examiner*—Brian Jennison
(74) *Attorney, Agent, or Firm*—Law Office of Steven W. Weinrieb

(57) ABSTRACT

A hot melt adhesive material dispensing system includes a communication system for transmitting information or data between the adhesive supply unit (ASU) and one or more applicator heads, wherein the number of hard wires actually interconnecting the adhesive supply unit (ASU) and the one or more hot melt adhesive material dispensing applicator heads can be reduced by the employment of signal couplers. In addition, the number of applicator heads that can be utilized in conjunction with a particular adhesive supply unit (ASU) can be increased by incorporating the temperature controller, normally disposed upon the adhesive supply unit (ASU), upon the applicator head.

19 Claims, 2 Drawing Sheets

INFORMATION COMMUNICATION SYSTEMS BETWEEN COMPONENTS OF A HOT MELT ADHESIVE MATERIAL DISPENSING SYSTEM

FIELD OF THE INVENTION

The present invention relates generally to hot melt adhesive material dispensing systems, and more particularly to new and improved communication systems for use within a hot melt adhesive material dispensing system for transmitting information or data between the various components of the hot melt adhesive material dispensing system, such as, for example, between the adhesive supply unit (ASU) and one or more of the hot melt adhesive material dispensing applicator heads, wherein the number of hard wires actually interconnecting the adhesive supply unit (ASU) and the one or more hot melt adhesive material dispensing applicator heads can actually be reduced, and wherein further, the number of hot melt adhesive material dispensing applicator heads that can be utilized in conjunction with a particular adhesive supply unit (ASU) can be dramatically increased in view of the fact that each one of the plurality of hot melt adhesive material dispensing applicator heads can effectively become more independent or modular with respect to the adhesive supply unit (ASU). In this manner, the overall hot melt adhesive material dispensing system is more simplified and cost-effective to implement.

BACKGROUND OF THE INVENTION

As is well known in the hot melt adhesive material dispensing art or industry, a typical hot melt adhesive material dispensing system comprises three primary components, an applicator head which comprises a hot melt adhesive material dispensing nozzle for dispensing a predetermined amount of the hot melt adhesive material, in a predetermined pattern, onto a substrate, an adhesive supply unit (ASU) which supplies the hot melt adhesive material to the applicator head, and a hot melt adhesive material hose assembly by means of which the hot melt adhesive material is conducted from the hot melt adhesive supply unit (ASU) to the applicator head. The hot melt adhesive material hose assembly conventionally comprises a tubular member which may be fabricated, for example, from TEFLON®, a stainless steel wire braid-type woven layer disposed therearound, and a pair of end fittings disposed upon opposite ends of the tubular member so as to respectively connect the opposite ends of the hot melt adhesive material hose assembly to the adhesive supply unit and to the applicator head. The tubular member, the end fittings, and the stainless steel wire braid-type woven layer together define the hot melt adhesive material hose core, and the hot melt adhesive material hose core is encased within multiple layers of wrapped tape. Furthermore, a heater circuit or wire is operatively associated with the hot melt adhesive material hose assembly, by being wrapped around the hot melt adhesive material hose core and disposed beneath one or more of the aforenoted layers of tape, in order to maintain the hot melt adhesive material, being conducted through the hot melt adhesive material hose assembly, at a predetermined temperature level such that the hot melt adhesive material will have or exhibit the proper viscosity properties when the hot melt adhesive material is to be dispensed from the dispensing nozzles of the applicator head.

Still yet further, it is also noted that the adhesive supply unit (ASU) comprises various electrical components, such as, for example, hot melt adhesive material supply pumps for supplying predetermined amounts of the hot melt adhesive material to the hot melt adhesive material hose assembly and ultimately to the applicator head, hot melt adhesive material supply valving for controlling the actual supply of the hot melt adhesive material into, through, or out from the adhesive supply unit (ASU), and the like. In a similar manner, it is noted that the applicator head also comprises various electrical components, such as, for example, solenoid-controlled mechanisms operatively associated with the hot melt adhesive material dispensing nozzle valving structure, valving structure utilized for controlling the routing or flow of control air streams, and the like. Accordingly, opposite end portions of the hot melt adhesive material hose assembly are respectively provided with electrical connectors which are not only adapted to be electrically connected to mating electrical connector structures fixedly mounted upon the hot melt adhesive supply unit (ASU) and the applicator head, but in addition, are adapted to terminate coaxial power cable assemblies through which various electrical wires, for providing electrical power and electrical connections to the aforenoted electrical components of the hot melt adhesive supply unit (ASU) and the applicator head, are routed.

It can therefore be readily appreciated that in view of the multiplicity of electrical connections that need to be made and implemented, a multiplicity of electrical wires must be routed between the various electrical components housed within the adhesive supply unit (ASU) and the various electrical components housed within the applicator head, and since the hot melt adhesive material hose assembly is effectively the only means effectively interconnecting the adhesive supply unit (ASU) to the applicator head, the wires must be routed along the hot melt adhesive material hose assembly. Accordingly, not only does a multiplicity of electrical wires need to be routed between the adhesive supply unit (ASU) and the applicator head, and along the hot melt adhesive material hose assembly, and not only does a multiplicity of electrical connections need to be made upon both the adhesive supply unit (ASU) and applicator head ends of the system, but in addition, the multiplicity of electrical wires add considerable size, bulk, and weight to the hot melt adhesive material hose assembly. Still yet further, it is also known in the hot melt adhesive material art or industry that the adhesive supply unit (ASU) conventionally comprises a temperature controller which is adapted to control the energization of the heater circuit or wire incorporated within the hot melt adhesive material hose assembly and/or the heater element incorporated within the applicator head so as to maintain the temperature of the hot melt adhesive material, either within the hot melt adhesive material hose assembly or within the applicator head, at a predetermined set point or level in response temperature levels sensed by one or more temperature sensors which may comprise, for example, resistance temperature detectors (RTDs). It is noted, however, that the space which is available upon the adhesive supply unit (ASU) for accommodating one or more temperature controllers is somewhat limited, and accordingly, only a limited or pre-determined number of temperature controllers are in fact able to be accommodated upon the adhesive supply unit (ASU). Thus, in view of such limited amount of available space upon the adhesive supply unit (ASU), the number of applicator heads that may be serviced by means of a single adhesive supply unit (ASU) is correspondingly limited.

A need therefore exists in the art for a new and improved hot melt adhesive material dispensing system wherein not only can the number of electrical wires and electrical connections between the adhesive supply unit (ASU) and the applicator head be substantially reduced, but in addition, the temperature controllers can be respectively incorporated within the applicator heads such that a multiplicity of applicator heads can easily be serviced by means of a single adhesive supply unit (ASU).

SUMMARY OF THE INVENTION

The foregoing and other objectives are achieved in accordance with the teachings and principles of the present invention through the provision of a new and improved hot melt adhesive material dispensing system which comprises an adhesive supply unit (ASU), at least one applicator head, and at least one hot melt adhesive material hose assembly interconnecting the adhesive supply unit (ASU) to the at least one applicator head, and wherein signal couplers are respectively incorporated within both the adhesive supply unit (ASU) and the applicator head so as to be electrically connected to the heater wire or circuit incorporated within the hot melt adhesive material hose assembly whereby the heater wire or circuit serves as a carrier wire or cable. In this manner, a bi-directional communication system is effectively established between the adhesive supply unit (ASU) and the applicator head whereby all data and control signal communications between the adhesive supply unit (ASU) and the applicator head are effectively overlayed upon, and carried by, the heater wire or circuit incorporated within the hot melt adhesive material hose assembly.

In addition, the temperature controller, normally incorporated within the adhesive supply unit (ASU), can be moved to the applicator head and can still effectively communicate with the main controller disposed upon the adhesive supply unit (ASU), by means of the signal coupler communication system, so as to nevertheless receive, for example, the required temperature set points or levels at which the hot melt adhesive material is to be maintained both within the hot melt adhesive material hose assembly and within the applicator head. Accordingly, if additional applicator heads are to be utilized in conjunction with the single adhesive supply unit (ASU), spatial considerations for accommodating the additional temperature controllers no longer presents a logistical problem in view of the fact that the applicator heads are relatively more independent from the adhesive supply unit (ASU) as a result of the temperature controllers now being incorporated within each applicator head. Still yet further, while many different types of signal couplers may be employed, utilized, or incorporated within the new and improved hot melt adhesive material dispensing system of the present invention, in lieu of the signal couplers being electrically connected to the heater wire or heater circuit, the signal couplers could have wireless transceivers incorporated therein so as to effectively achieve the bi-directional communication between the adhesive supply unit (ASU) and the one or more applicator heads.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
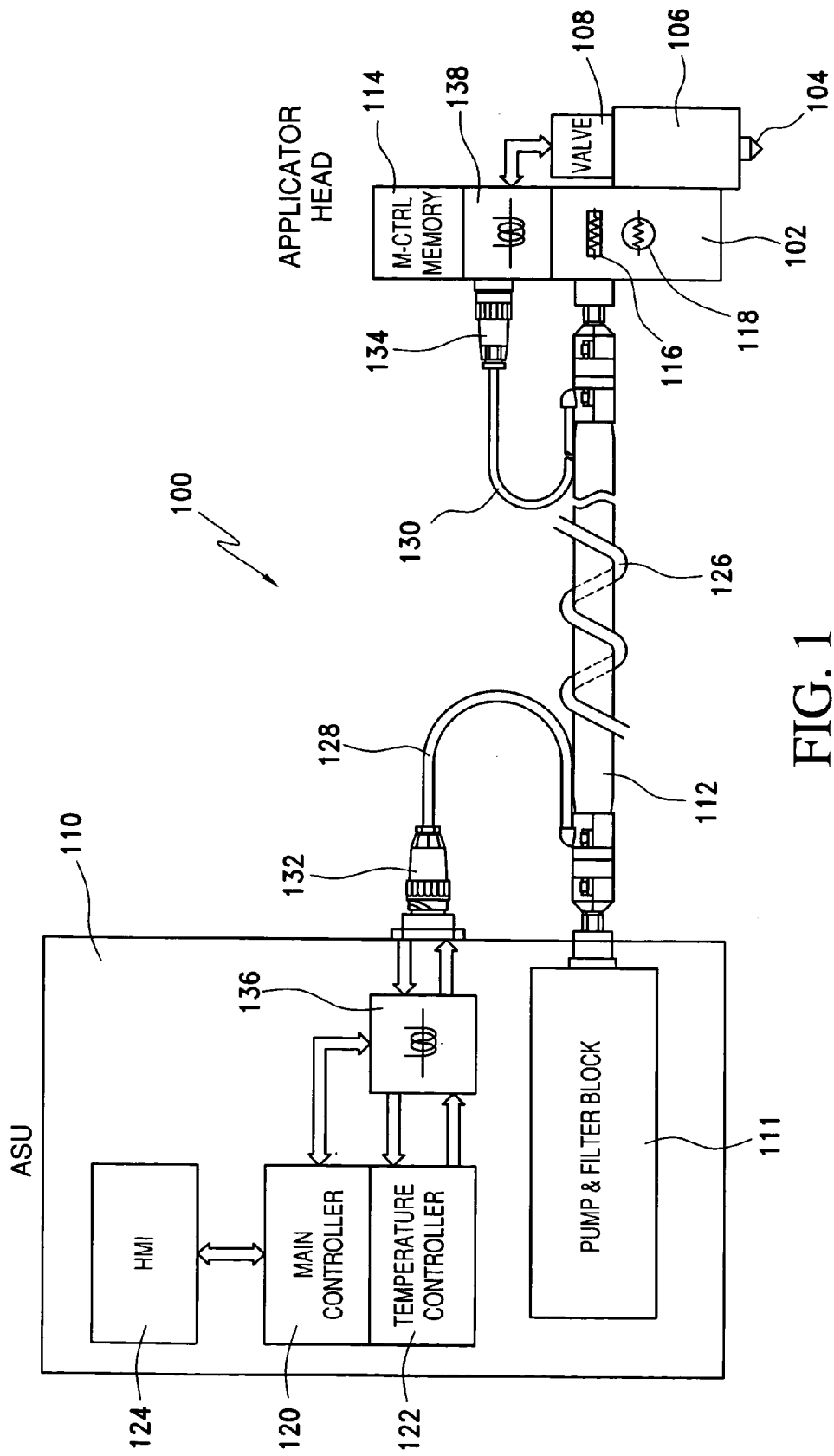
FIG. 1 is a schematic drawing illustrating a first embodiment of a new and improved hot melt adhesive material dispensing system constructed in accordance with the principles and teachings of the present invention and showing the cooperative parts thereof, and wherein, in particular, the temperature controller is illustrated as being structurally incorporated within the adhesive supply unit.

Referring now to the drawings, and more particularly to FIG. 1 thereof, a first embodiment of a new and improved hot melt adhesive material dispensing system, as constructed in accordance with the principles and teachings of the present invention and showing the cooperative parts thereof, is disclosed and is generally indicated by the reference character 100. More particularly, it is seen that the new and improved hot melt adhesive material dispensing system 100 comprises an applicator head 102 from which the hot melt adhesive material is to be dispensed or discharged by means of a hot melt adhesive material dispensing or discharge nozzle 104. The hot melt adhesive material dispensing or discharge nozzle 104 is incorporated within an applicator head module 106, and the dispensing or discharge opening of the hot melt adhesive material dispensing or discharge nozzle 104 is controlled by means of a suitable control valve mechanism 108. An adhesive supply unit (ASU) 110 supplies the hot melt adhesive material toward the applicator head 102, as a result of the hot melt adhesive material being conducted through a pump and filter block assembly 111, such that the hot melt adhesive material can be dispensed or discharged by means of the hot melt adhesive material dispensing or discharge nozzle 104 thereof, and a hot melt adhesive material hose assembly 112 fluidically interconnects the adhesive supply unit (ASU) 110 and the applicator head 102 such that the hot melt adhesive material is in fact able to be conducted from the adhesive supply unit (ASU) 110 to the applicator head 102.

Continuing further, it is seen that the applicator head 102 further comprises various electronic components, such as, for example, its own microcontroller/logic or memory (M-CTRL MEMORY) 114, a hot melt adhesive material heater 116, and a temperature sensor 118 which may take the form of, for example, a resistance temperature detector (RTD), although other types of temperature sensors may be employed. In a similar manner, the adhesive supply unit (ASU) 110 is seen to comprise a plurality of electronic components, such as, for example, a main microprocessor or main controller 120, a temperature controller 122, and a human-machine interface (HMI) or display panel 124. All of the electronic components of the applicator head 102, such as, for example, the control valve mechanism 108, the hot melt adhesive material heater 116, and the temperature sensor 118, are electrically connected to the microcontroller/logic or memory (M-CTRL MEMORY) 114 of the applicator head 102, and the microcontroller/logic or memory (M-CTRL MEMORY) 114 of the applicator head 102 normally transmits device-specific information, concerning the various aforenoted electronic components of the applicator head 102, to the main microprocessor or main controller 120 of the adhesive supply unit (ASU) 110. In this manner, the main microprocessor or main controller 120 of the adhesive supply unit (ASU) 110 is effectively able to, for example, determine the set-up, arrangement, configuration, or location of the various electronic components disposed upon the applicator head 102, precisely what type of electronic components are present upon the applicator head 102, their manufacturer, and the like.

In addition, since the main microprocessor or main controller 120 of the adhesive supply unit (ASU) 110 knows the various operating parameters of the various different electronic components located upon the applicator head 102, the main microprocessor or main controller 120 of the adhesive supply unit (ASU) 110 can accordingly control the various different electronic components located upon the applicator head 102 in accordance with any one of a multiplicity of pre-determined programs incorporated within the memory of main microprocessor or main controller 120. For example, the control valve mechanism 108 disposed upon the applicator head 102 needs to be switched between its OPEN and CLOSED states depending upon the adhesive pattern to be deposited onto the particular substrate. Accordingly, the main microprocessor or main controller 120 will transmit suitable control signals to the control valve mechanism 108. In a similar, but converse or reverse manner, maintenance may be required to be performed upon the applicator head 102, more specifically, for example, one of the filter members operatively associated with the hot melt adhesive material dispensing or discharge nozzle 104 may become clogged and would therefore need to be changed, or alternatively, it may simply be time to change the filter member in accordance with routine preventive maintenance procedures. In either case, this information will be transmitted to the microcontroller/logic or memory (M-CTRL MEMORY) 114 of the applicator head 102, and the microcontroller/logic or memory (M-CTRL MEMORY) 114 of the applicator head 102 will, in turn, transmit such information to the main microprocessor or main controller 120 of the adhesive supply unit (ASU) 110. The main microprocessor or main controller 120 of the adhesive supply unit (ASU) 110 will, in turn, transmit the information or data to the human-machine interface or display panel 124 whereby, for example, operator personnel can implement the necessary maintenance procedures.

Still yet further, temperature levels characteristic of the hot melt adhesive material present within the applicator head 102 are adapted to be detected by means of the temperature sensor (RTD) 118 located upon the applicator head 102, and such information or data is transmitted back to temperature controller 122 disposed upon the adhesive supply unit (ASU) 110. The temperature controller 122 will, in turn, send control signals, not only to a heater wire or circuit 126 disposed around the hot melt adhesive material hose assembly 112 in order to cyclically energize the same and thus maintain the temperature level of the hot melt adhesive material flowing through the hot melt adhesive material hose assembly 112 at a predeterminedly desired temperature level as set or predetermined by means of the main microprocessor or main controller 120, but in addition, the temperature controller 122 will also send control signals to the hot melt adhesive material heater 116 disposed upon the applicator head 102 so as to likewise cyclically energize the same and thereby maintain the temperature level of the hot melt adhesive material present within the applicator head at a predeterminedly desired temperature level as is likewise set or predetermined by means of the main microprocessor or main controller 120.

In light of the foregoing, it can be readily appreciated that all of the communication, data, and control signals must be transmitted between the various electrical components incorporated within the applicator head 102 and the adhesive supply unit (ASU) 110, and between the various electrical components incorporated within the adhesive supply unit (ASU) 110 and the applicator head 102, by means of a multiplicity of electrical wires which are not only incorporated upon the hot melt adhesive material hose assembly, but in addition, are incorporated within, or routed through, a pair of coaxial cables 128,130 and a pair of electrical connectors 132,134 wherein, for example, one end of the coaxial cable 128 is fixedly connected to the hot melt adhesive material hose assembly 112 while the other end of the coaxial cable 128 is fixedly connected to the electrical connector 132, and in a similar manner, one end of the coaxial cable 130 is fixedly connected to the hot melt adhesive material hose assembly 112 while the other end of the coaxial cable 130 is fixedly connected to the electrical connector 134. It is also noted that the electrical connector 132 electrically interfaces with a suitable electrical connector fixedly mounted upon the adhesive supply unit (ASU) 110 while the electrical connector 134 electrically interfaces with a suitable electrical connector fixedly mounted upon the applicator head 102. Accordingly, it can be readily appreciated still further that not only does a multiplicity of electrical connections need to be made upon both the adhesive supply unit (ASU) 110 and the applicator head 102 ends of the system, wherein such connections are tedious and time-consuming, but in addition, the multiplicity of electrical wires add considerable size, bulk, and weight to the hot melt adhesive material hose assembly 112. It would therefore be beneficial and cost effective if the number of electrical wires and electrical connections between the adhesive supply unit (ASU) 110 and the applicator head 102 of the overall hot melt adhesive material dispensing system 100 could be substantially reduced.

Therefore, in accordance with the primary principles and teachings of the present invention, first and second signal couplers 136,138 are respectively incorporated within the adhesive supply unit (ASU) 110 and the applicator head 102 and are electrically connected to the electrical connectors 132,134. More importantly, it is to be noted that as a result of the respective incorporation of the first and second signal couplers 136,138 within the adhesive supply unit (ASU) 110 and the applicator head 102, substantially all of the aforenoted electrical wires and electrical connections have been able to be eliminated with the exception, for example, of the heater wire or circuit 126 which is in fact wrapped around and incorporated within the hot melt adhesive material hose assembly 112 and which is substantially indispensible to the overall system in that the hot melt adhesive material hose assembly 112 needs to be heated in order to maintain the hot melt adhesive material flowing therethrough at its predeterminedly desired temperature level. It is noted that in connection with some hot melt adhesive material hose assemblies, such as, for example, as illustrated within United States Patent Application Publication US 2005/0092736, which was published in the name of Raterman et al. on May 5, 2005, temperature sensing devices, in the form of temperature resistance detectors (RTDs), may be operatively associated with or incorporated within wires which may likewise be wound upon and incorporated within the hot melt adhesive material hose assembly 112, and therefore, for illustrative purposes, the wire 126 may comprise either the heater wire or circuit or the temperature sensing device wire, wherein either one of such wires can serve as a carrier for information, data, control signals, and the like, which may be overlayed onto the carrier wire by means of the signal couplers 136,138 and transmitted from the adhesive supply unit (ASU) 110 to the applicator head 102, or from the applicator head 102 to the adhesive supply unit (ASU) 110.

Therefore, it can be readily appreciated that in accordance with the principles and teachings of the present invention, and by respectively incorporating the aforenoted signal couplers 136,138 into the adhesive supply unit (ASU) 110 and the applicator head 102, not only can all information, data, control signals, and the like be transmitted between the adhesive supply unit (ASU) 110 and the applicator head 102 by means of the single carrier wire 126, that is, either the heater wire or circuit, or the temperature sensing device wire, thereby effectively eliminating the aforenoted multiplicity of electrical wires and electrical connections, but in addition, the information, data, control signals, and the like are able to be transmitted over an already existing wire. It is of course to be further appreciated that the system may be simplified still further by not having the temperature sensing device wire wrapped around and incorporated upon the hot melt adhesive material hose assembly 112, wherein, for example, only the temperature sensor 118 would be incorporated within the applicator head 102 whereby, again, the actual or detected temperature level information or data can be coded and transmitted to the temperature controller 122 by means of the heater wire or circuit 126 serving as the carrier wire of the signal coupler system. In this manner, only the heater wire or circuit 126 would be wrapped around and incorporated within the hot melt adhesive material hose assembly 112 making the same simpler in construction, less bulky, and lighter in weight. It is also noted that while the signal couplers 136,138 could comprise any one type of conventionally available signal coupler, an example of a signal coupler which would be particularly advantageous for use in the new and improved hot melt adhesive material dispensing system 100 of the present invention would comprise a wireless signal coupler. More particularly, each one of the signal couplers 136,138 could comprise, for example, a wireless transceiver whereby the two-way or bi-directional communication between the various electronic components of the adhesive supply unit (ASU) 110 and the applicator head 102 would be able to be achieved independent of the heater wire or circuit 126.

Continuing still further, it has been previously noted that an operational drawback or disadvantage characteristic of some hot melt adhesive material dispensing systems resides in the fact that the space which is available upon the adhesive supply unit (ASU) for accommodating one or more temperature controllers is somewhat limited, and accordingly, only a limited or predetermined number of temperature controllers are in fact able to be accommodated upon the adhesive supply unit (ASU). Thus, in view of such limited amount of available space upon the adhesive supply unit (ASU), the number of applicator heads that may be serviced by means of a single adhesive supply unit (ASU) is correspondingly limited. Therefore, a new and improved second embodiment of a hot melt adhesive material dispensing system, as constructed in accordance with further principles and teachings of the present invention, and showing the cooperative parts thereof, is disclosed within FIG. 2 and is generally indicated by the reference character 200.

Figure 2:
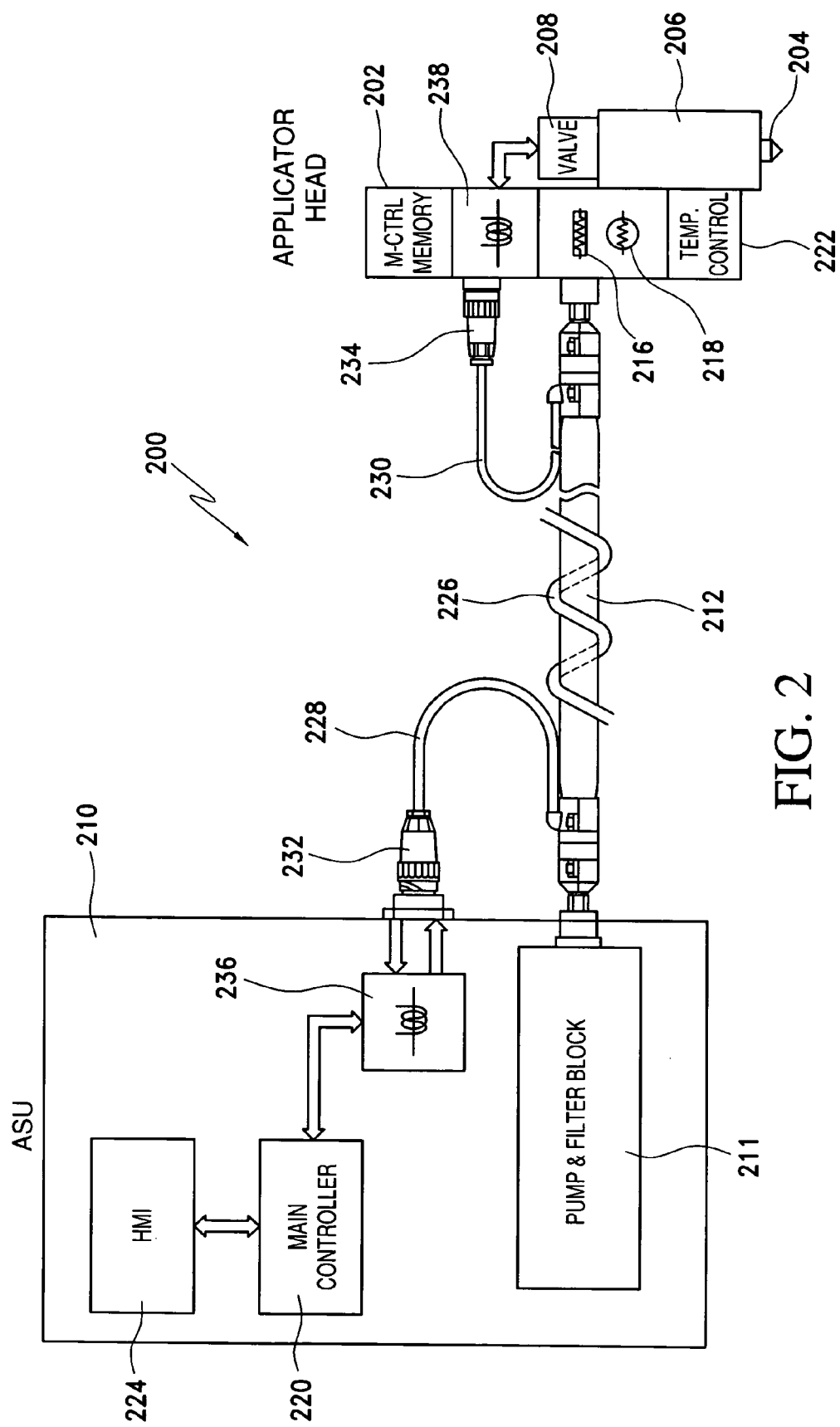
FIG. 2 is a schematic drawing, similar to that of FIG. 1, illustrating, however, a second embodiment of a new and improved hot melt adhesive material dispensing system as constructed in accordance with the principles and teachings of the present invention and showing the cooperative parts thereof, and wherein, in particular, the temperature controller is illustrated as having been removed from the adhesive supply unit and structurally incorporated within the applicator head.

It is to be noted that in view of the similarity between the first and second embodiments of the hot melt adhesive material dispensing systems 100,200 as respectively disclosed within FIGS. 1 and 2, a detailed description of the second embodiment will be omitted herefrom for brevity purposes, the discussion of the second embodiment hot melt adhesive material dispensing system 200 being directed toward the differences between the first and second hot melt adhesive material dispensing systems 100,200. In addition, it is also noted that component parts of the second embodiment hot melt adhesive material dispensing system 200 which correspond to component parts of the first embodiment hot melt adhesive material dispensing system 100 will be designated by similar reference characters except that they will be within the 200 series. More particularly, it is seen that in accordance with the principles and teachings of the second embodiment of the hot melt adhesive material dispensing system 200, the temperature controller 222 has effectively been removed from the adhesive supply unit (ASU) 210 and incorporated within the applicator head 202. In this manner, not only is each applicator head 202 now, in effect, substantially independent of the adhesive supply unit (ASU) 210, other than receiving the supply of hot melt adhesive material from the adhesive supply unit (ASU) 210 and the appropriate control signals from the main controller 220, but in addition, when a multiplicity of applicator heads 202 are adapted or desired to be operatively connected to a single adhesive supply unit (ASU) 210, spatial considerations, with respect to physically or structurally accommodating the multiplicity of temperature controllers 222 within the adhesive supply unit (ASU) 210, are no longer an issue, and a multiplicity of applicator heads 202 can in fact easily or readily be serviced by means of a single adhesive supply unit (ASU) 210.

Thus, it may be seen that in accordance with the teachings and principles of the present invention, there has been provided a new and improved hot melt adhesive material dispensing system which comprises an adhesive supply unit (ASU), at least one applicator head, and at least one hot melt adhesive material hose assembly interconnecting the adhesive supply unit (ASU) to the at least one applicator head, and wherein signal couplers are respectively incorporated in both the adhesive supply unit (ASU) and the applicator head so as to be electrically connected to the heater wire or circuit incorporated within the hot melt adhesive material hose assembly whereby the heater wire or circuit serves as a carrier wire or cable for information, data, and signal transmissions. In this manner, a bi-directional communication system is effectively established between the adhesive supply unit (ASU) and the applicator head whereby all data, information, and control signal communications between the adhesive supply unit (ASU) and the applicator head are effectively overlayed upon, and carried by, the heater wire or circuit incorporated within the hot melt adhesive material hose assembly.

In addition, the temperature controller, normally incorporated within the adhesive supply unit (ASU), can be moved to the applicator head and can still effectively communicate with the main controller disposed upon the adhesive supply unit (ASU), by means of the signal coupler communication system, so as to nevertheless receive, for example, the required temperature set points or levels at which the hot melt adhesive material is to be maintained both within the hot melt adhesive material hose assembly and within the applicator head. Accordingly, if additional applicator heads are to be utilized in conjunction with the single adhesive supply unit (ASU), spatial considerations for accommodating the additional temperature controllers no longer presents a logistical problem in view of the fact that the applicator heads are relatively more independent from the adhesive supply unit (ASU) in view of the fact that the temperature controllers are now incorporated within each applicator head. Still yet further, while many different types of signal couplers may be employed, utilized, or incorporated within the new and improved hot melt adhesive material dispensing system of the present invention, in lieu of the signal couplers being electrically connected to the heater wire or heater circuit, the signal couplers could have wireless transceivers incorporated therein so as to effectively achieve the bi-directional communication between the adhesive supply unit (ASU) and the one or more applicator heads.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A hot melt adhesive material dispensing system comprising:
   an adhesive supply unit (ASU) for providing a supply of hot melt adhesive material to be dispensed;
   at least one electrical component disposed upon said adhesive supply unit (ASU);
   an applicator head for dispensing hot melt adhesive material supplied to said applicator head by said adhesive supply unit;
   at least one electrical component disposed upon said applicator head;
   a hot melt adhesive material hose assembly having opposite ends thereof fixedly connected to said adhesive supply unit (ASU) and said applicator head for conducting hot melt adhesive material from said adhesive supply unit (ASU) to said applicator head;
   a wire incorporated within said hot melt adhesive material hose assembly;
   a first signal coupler disposed upon said adhesive supply unit (ASU) for receiving a multiplicity of data, information, and control signals from said at least one electrical component disposed upon said adhesive supply unit (ASU); and
   a second signal coupler disposed upon said applicator head for receiving a multiplicity of data, information, and control signals from said at least one electrical component disposed upon said applicator head,
   wherein said multiplicity of data, information and control signals are conveyed between said at least one electrical component disposed upon said adhesive supply unit (ASU) and said at least one electrical component disposed upon said applicator head by means of said wire incorporated within said hot melt adhesive material hose assembly as a result of said wire, incorporated within said hot melt adhesive material hose assembly, serving as a carrier for said multiplicity of data, information, and control signals which are overlayed onto said wire by said first and second signal couplers such that said multiplicity of said data, information, and control signals are transmitted from said at least one electrical component disposed upon said adhesive supply unit (ASU) to said at least one electrical component disposed upon said applicator head, and from said at least one electrical component disposed upon said applicator head to said at least one electrical component disposed upon said adhesive supply unit (ASU).

2. The hot melt adhesive material dispensing system as set forth in claim 1, wherein:
   said wire incorporated within said hot melt adhesive material hose assembly comprises a heater circuit wire for heating the hot melt adhesive material being conveyed through said hot melt adhesive material hose assembly from said adhesive supply unit (ASU) to said applicator head.

3. The hot melt adhesive material dispensing system as set forth in claim 1, wherein:
   said wire incorporated within said hot melt adhesive material hose assembly comprises a temperature sensing device wire for sensing the temperature of the hot melt adhesive material being conveyed through said hot melt adhesive material hose assembly from said adhesive supply unit (ASU) to said applicator head.

4. The hot melt adhesive material dispensing system as set forth in claim 1, wherein:
   said at least one electrical component disposed upon said adhesive supply unit (ASU) is selected from the group comprising a human-machine interface (HMI), a main controller, and a temperature controller.

5. The hot melt adhesive material dispensing system as set forth in claim 1, wherein:
   said at least one electrical component disposed upon said applicator head is selected from the group comprising a microcontroller/logic memory, a control valve mechanism for a dispensing nozzle, a hot melt adhesive material temperature sensor, and a hot melt adhesive material heater.

6. A hot melt adhesive material dispensing system comprising:
   an adhesive supply unit (ASU) for providing a supply of hot melt adhesive material to be dispensed;
   at least one electrical component disposed upon said adhesive supply unit (ASU);
   an applicator head for dispensing hot melt adhesive material supplied to said applicator head by said adhesive supply unit;
   at least one electrical component disposed upon said applicator head;
   a hot melt adhesive material hose assembly having opposite ends thereof fixedly connected to said adhesive supply unit (ASU) and said applicator head for conducting hot melt adhesive material from said adhesive supply unit (ASU) to said applicator head;
   a first signal coupler disposed upon said adhesive supply unit (ASU) for receiving a multiplicity of data, information, and control signals from said at least one electrical component disposed upon said adhesive supply unit (ASU); and
   a second signal coupler disposed upon said applicator head for receiving a multiplicity of data, information, and control signals from said at least one electrical component disposed upon said applicator head,
   wherein said multiplicity of data, information, and control signals are conveyed between said at least one electrical component disposed upon said adhesive supply unit (ASU) and said at least one electrical component disposed upon said applicator head by said first and second signal couplers such that said multiplicity of said data, information, and control signals are transmitted from said at least one electrical component disposed upon said adhesive supply unit (ASU) to said at least one electrical component disposed upon said applicator head, and from said at least one electrical component disposed upon said applicator head to said at least one electrical component disposed upon said adhesive supply unit (ASU).

7. The hot melt adhesive material dispensing system as set forth in claim 6, wherein:
   said first and second signal couplers comprise wireless transceivers.

8. The hot melt adhesive material dispensing system as set forth in claim 6, further comprising:
   a wire incorporated within said hot melt adhesive material hose assembly,
   wherein said first and second signal couplers, respectively disposed upon said adhesive supply unit (ASU) and said applicator head, for conveying said data, information, and control signals between said at least one electrical component disposed upon said adhesive supply unit (ASU) and said at least one electrical component disposed upon said applicator head, conveys said data, information, and control signals by means of said wire incorporated within said hot melt adhesive material hose assembly, wherein said wire, incorporated within said hot melt adhesive material hose assembly, serves as a carrier for said data, information, and control signals which are overlayed onto said wire by said first and second signal couplers such that said data, information, and control signals can be transmitted from said at least one electrical component disposed upon said adhesive supply unit (ASU) to said at least one electrical component disposed upon said applicator head, and from said at least one electrical component disposed upon said applicator head to said at least one electrical component disposed upon said adhesive supply unit (ASU).

9. The hot melt adhesive material dispensing system as set forth in claim 8, wherein:
said wire incorporated within said hot melt adhesive material hose assembly comprises a heater circuit wire for heating the hot melt adhesive material being conveyed through said hot melt adhesive material hose assembly from said adhesive supply unit (ASU) to said applicator head.

10. The hot melt adhesive material dispensing system as set forth in claim 8, wherein:
said wire incorporated within said hot melt adhesive material hose assembly comprises a temperature sensing device wire for sensing the temperature of the hot melt adhesive material being conveyed through said hot melt adhesive material hose assembly from said adhesive supply unit (ASU) to said applicator head.

11. The hot melt adhesive material dispensing system as set forth in claim 6, wherein:
said at least one electrical component disposed upon said adhesive supply unit (ASU) is selected from the group comprising a human-machine interface (HMI), a main controller, and a temperature controller.

12. The hot melt adhesive material dispensing system as set forth in claim 6, wherein:
said at least one electrical component disposed upon said applicator head is selected from the group comprising a microcontroller/logic memory, a control valve mechanism for a dispensing nozzle, a hot melt adhesive material temperature sensor, and a hot melt adhesive material heater.

13. A hot melt adhesive material dispensing system comprising:
an adhesive supply unit (ASU) for providing a supply of hot melt adhesive material to be dispensed;
at least one electrical component disposed upon said adhesive supply unit (ASU);
an applicator head for dispensing hot melt adhesive material supplied to said applicator head by said adhesive supply unit;
a temperature controller disposed upon said applicator head so as to eliminate the necessity of providing sufficient space for said temperature controller upon said adhesive supply unit (ASU) whereby an enhanced multiplicity of applicator heads can be operatively connected to said adhesive supply unit (ASU) than would otherwise be possible if said temperature controller for each applicator head was disposed upon said adhesive supply unit (ASU);
at least one electrical component, other than said temperature controller, disposed upon said applicator head;
a hot melt adhesive material hose assembly having opposite ends thereof fixedly connected to said adhesive supply unit (ASU) and said applicator head for conducting hot melt adhesive material from said adhesive supply unit (ASU) to said applicator head;
a first signal coupler disposed upon said adhesive supply unit (ASU) for receiving a multiplicity of data, information, and control signals from said at least one electrical component disposed upon said adhesive supply unit (ASU); and
a second signal coupler disposed upon said applicator head for receiving a multiplicity of data, information, and control signals from said at least one electrical component disposed upon said applicator head,
wherein said multiplicity of data, information, and control signals are conveyed between said at least one electrical component disposed upon said adhesive supply unit (ASU) and said at least one electrical component disposed upon said applicator head by said first and second signal couplers such that said multiplicity of said data, information, and control signals are transmitted from said at least one electrical component disposed upon said adhesive supply unit (ASU) to said at least one electrical component disposed upon said applicator head, and from said at least one electrical component disposed upon said applicator head to said at least one electrical component disposed upon said adhesive supply unit (ASU).

14. The hot melt adhesive material dispensing system as set forth in claim 13, wherein:
said first and second signal coupler means comprise wireless transceivers.

15. The hot melt adhesive material dispensing system as set forth in claim 13, further comprising:
a wire incorporated within said hot melt adhesive material hose assembly,
wherein said first and second signal couplers respectively disposed upon said adhesive supply unit (ASU) and said applicator head, for conveying said data, information, and control signals between said at least one electrical component disposed upon said adhesive supply unit (ASU) and said at least one electrical component disposed upon said applicator head, conveys said data, information, and control signals by means of said wire incorporated within said hot melt adhesive material hose assembly, wherein said wire, incorporated within said hot melt adhesive material hose assembly, serves as a carrier for said data, information, and control signals which are overlayed onto said wire by said first and second signal couplers such that said data, information, and control signals can be transmitted from said at least one electrical component disposed upon said adhesive supply unit (ASU) to said at least one electrical component disposed upon said applicator head, and from said at least one electrical component disposed upon said applicator head to said at least one electrical component disposed upon said adhesive supply unit (ASU).

16. The hot melt adhesive material dispensing system as set forth in claim 15, wherein:
said wire incorporated within said hot melt adhesive material hose assembly comprises a heater circuit wire for heating the hot melt adhesive material being conveyed through said hot melt adhesive material hose assembly from said adhesive supply unit (ASU) to said applicator head.

17. The hot melt adhesive material dispensing system as set forth in claim 15, wherein:

said wire incorporated within said hot melt adhesive material hose assembly comprises a temperature sensing device wire for sensing the temperature of the hot melt adhesive material being conveyed through said hot melt adhesive material hose assembly from said adhesive supply unit (ASU) to said applicator head.

18. The hot melt adhesive material dispensing system as set forth in claim 13, wherein:

said at least one electrical component disposed upon said adhesive supply unit (ASU) is selected from the group comprising a human-machine interface (HMI) and a main controller.

19. The hot melt adhesive material dispensing system as set forth in claim 13, wherein:

said at least one electrical component disposed upon said applicator head is selected from the group comprising a microcontroller/logic memory, a control valve mechanism for a dispensing nozzle, a hot melt adhesive material temperature sensor, and a hot melt adhesive material heater.

* * * * *